United States Patent [19]

Fukui

[11] Patent Number: 5,758,498
[45] Date of Patent: Jun. 2, 1998

[54] CATALYTIC DEVICE OF ELECTRICALLY HEATED TYPE

[75] Inventor: Toyoaki Fukui, Uji, Japan

[73] Assignee: Mitsubishi Jidosha Kogyo Kabushiki Kaisha, Tokyo, Japan

[21] Appl. No.: 447,927

[22] Filed: May 23, 1995

Related U.S. Application Data

[63] Continuation of Ser. No. 91,448, Jul. 15, 1993, abandoned.

[30] Foreign Application Priority Data

Jul. 16, 1992 [JP] Japan .................. 4-189311
Jul. 5, 1993 [JP] Japan .................. 5-165640

[51] Int. Cl.$^6$ .................................. F01N 3/28
[52] U.S. Cl. ................ 60/300; 422/171; 422/174; 422/180
[58] Field of Search ............... 60/299, 300; 422/180, 422/174, 171

[56] References Cited

U.S. PATENT DOCUMENTS

| | | | |
|---|---|---|---|
| 4,118,199 | 10/1978 | Völker | 422/171 |
| 4,134,733 | 1/1979 | Völker | 422/180 |
| 4,857,089 | 8/1989 | Kitagawa | 60/311 |
| 5,146,743 | 9/1992 | Maus | 60/300 |
| 5,229,080 | 7/1993 | Abe | 422/174 |
| 5,259,190 | 11/1993 | Bagley | 60/300 |
| 5,296,198 | 3/1994 | Abe | 422/174 |

OTHER PUBLICATIONS

JP Laid–Open Publication No. He 4–194311: Laid open on Jul. 14, 1992; *Heater for Honeycomb Catalytic Converter*; English Abstract.

(WPAT) JPO 4–171214–A Jun. 18, 1992: Internal Combust Engine; by K. Nishizawa et al.; English Abstract.

*Primary Examiner*—Douglas Hart

[57] ABSTRACT

A catalytic device is disclosed, in which a catalytic layer is electrically heated and activated. In one form, the quantity of the catalytic layer is greater near a gas outlet than near a gas inlet of the device. In another form, the catalytic layer is disposed only near the gas outlet. The catalytic layer can be quickly activated so as to promote purification of exhaust emissions immediately following the ignition.

5 Claims, 4 Drawing Sheets

CATALYTIC DEVICE OF ELECTRICALLY HEATED TYPE

This application is a continuation, of application Ser. No. 08/091,448 filed on Jul. 15, 1993, now abandoned.

BACKGROUND OF THE INVENTION

1. Field of the Invention

This invention relates to a catalytic device of the electrically heated type which is located in an exhaust system of an internal combustion engine and is electrically heated so as to be active.

2. Description of the Related Art

Up to now, efforts have been made to study and develop catalytic devices which are electrically heated so as to rapidly activate their catalyst immediately following the ignition. Referring to FIG. 5 of the accompanying drawings, there is shown an example of such a catalytic device 10, which is disposed in the middle of an exhaust passage between a combustion chamber 12 of an engine 11 and a muffler 14. The catalytic device 10 includes a carrying member 15 which carries a catalytic layer thereon. The carrying member 15 is a resistance heating element, and electricity is applied from a battery power source 17 via a switch 16, so that the catalytic layer on the carrying member 15 is quickly activated so as to reduce toxic substances such as carbon monoxide (CO) and hydrocarbons (HC) in exhaust gas from the combustion chamber 11.

The foregoing carrying member 15 is usually uniformly heated by electric currents. When a relatively cold exhaust gas flows immediately after the ignition, heat generated by the heated catalytic layer is, however, caused to flow from a gas inlet of the catalytic device to a gas outlet thereof. Therefore, the catalytic layer near the gas outlet tends to become too hot, which leads to a problem that the catalytic layer is not sufficiently heated and activated near the gas inlet immediately after the ignition. This phenomenon prevents the catalytic device from extensively purifying and reducing the toxic substances in exhaust emissions.

SUMMARY OF THE INVENTION

It is an object of the invention to provide a catalytic device of the electrically heated type, in which the catalytic layer is applied in different quantities near the gas inlet and the gas outlet so that the catalytic layer can be quickly activated by electrical heating. Such a catalytic device has excellent exhaust gas purifying performance immediately following the ignition.

In one aspect of the invention, the catalytic device comprises a carrying member which is electrically heated, and a catalytic layer which becomes active when heated above a predetermined temperature and is supported on the carrying member. The quantity of the catalytic layer is greater near the gas outlet of the catalytic device than that near the gas inlet thereof.

In this arrangement, the catalytic layer may be two times greater near the gas outlet than the catalytic layer near the gas inlet.

In another aspect of the invention, the catalytic device comprises two carrying members which are electrically heated, and a catalytic layer which becomes active when heated above a predetermined temperature and is supported on one of the two carrying members near a gas outlet.

When the carrying member is electrically heated, much heat is transmitted near the gas outlet, so that the thick catalytic layer is heated and activated there. Conversely, since the catalytic layer is relatively thin and has a small heat capacity near the gas inlet, it can be easily and quickly heated and activated by a small amount of heat.

The catalytic layer may comprise platinum as catalyst, and helpful agents such as transition alumina, accelerating agent and stabilizer.

The catalytic device can be quickly heated and activated so as to efficiently purify and reduce exhaust gas immediately after the ignition.

DETAILED DESCRIPTION OF PREFERRED EMBODIMENTS

The invention will be described with reference to preferred embodiments shown in FIG. 1 to FIG. 5.

Figure 1:
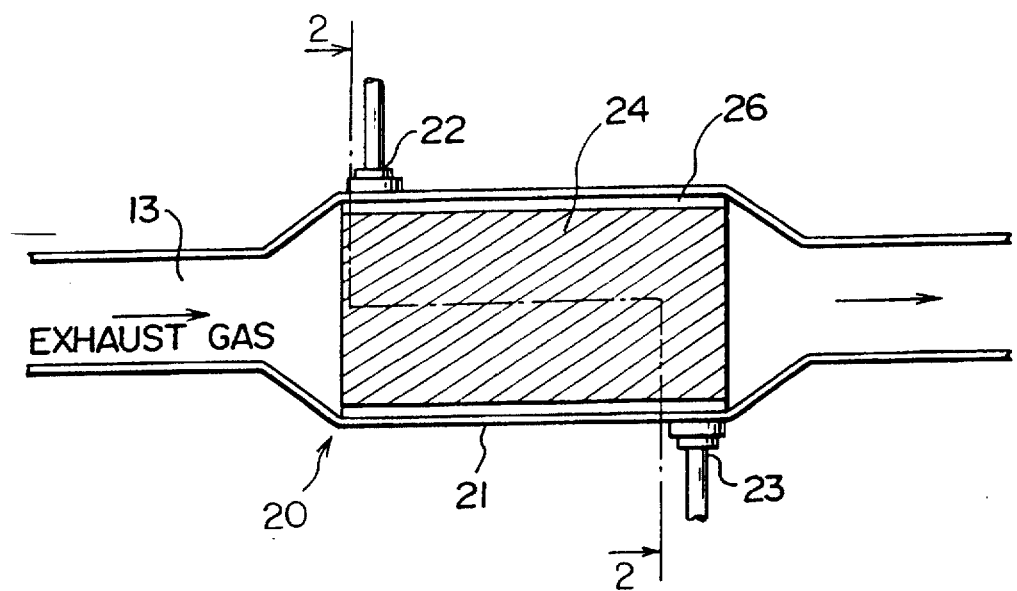
FIG. 1 is a side cross-sectional view of a catalytic device of the electrically heated type according to a first embodiment of the invention.
Figure 2:
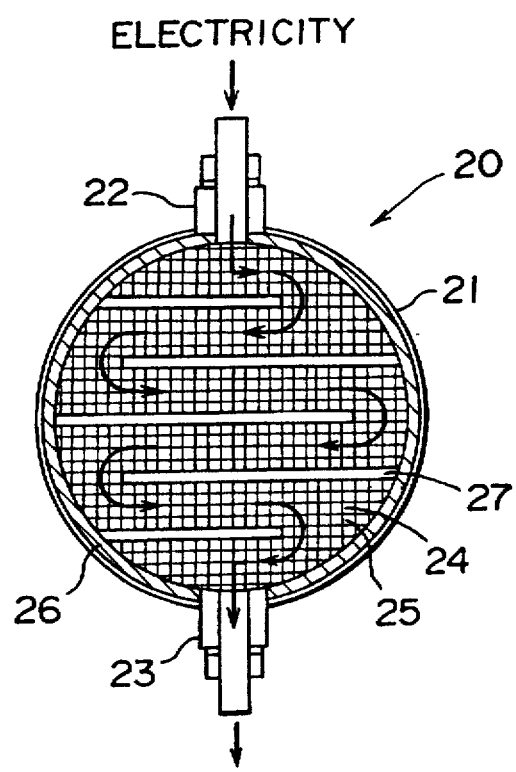
FIG. 2 is a cross-sectional view of the catalytic device along line 2—2 of FIG. 1.

Referring to FIG. 1 and FIG. 2, a catalytic device 20 comprises a canister 21 made of heat resisting alloy, electrodes 22 and 23 connected to a battery power source (not shown), a carrying member 24 made of heat resisting alloy, a catalytic layer 25 supported the carrying member 24, a plurality of slits 27 defining current paths, and insulation material 26 surrounding the carrying member 24.

The carrying member 24 is a kind of resistance element, which is heated by an electric current from the battery power source so as to activate the catalytic layer 25.

The catalytic layer 25 comprises catalyst such as platinum, and helpful agents such as transition alumina, accelerating agent and stabilizer. The quantity of the catalytic layer 25 is differentiated near the gas inlet and the gas outlet, respectively. Specifically, the quantity of the catalytic layer 25 is set to be in a range where the catalytic layer 25 can be sufficiently activated without degrading its performance.

For instance, the carrying member 24 has a capacity of 0.3 liters (i.e. 0.15 liters each near the gas inlet and near the gas outlet, respectively). The carrying member 24 holds 1.0 gram/liter and 2.0 grams/liter of the catalytic layer 25 of a platinum group near the gas inlet and gas inlet, respectively. In other words, the quantity of the catalytic layer 25 near the gas outlet is twice as great as that near the gas inlet. In this case, an electric current of 24V and 200A is applied to the carrying member 24 from the battery power source, so that the carrying member is sufficiently heated to activate the catalytic layer 25.

Since much heat is transmitted to the gas outlet, the thick catalytic layer 25 is extensively heated there. The thin catalytic layer 25 at the gas inlet can be sufficiently heated with less heat so as to become active.

Compared to a conventional catalytic device, the catalytic layer 25 is more efficient and sufficiently heated and activated so that the catalytic device can effectively and reliably purify toxic substances in exhaust gas flowing to the exhaust passage in the direction shown by an arrow in FIG. 1, so that exhaust gas is discharged as non-toxic substances into the atmosphere.

Figure 3:
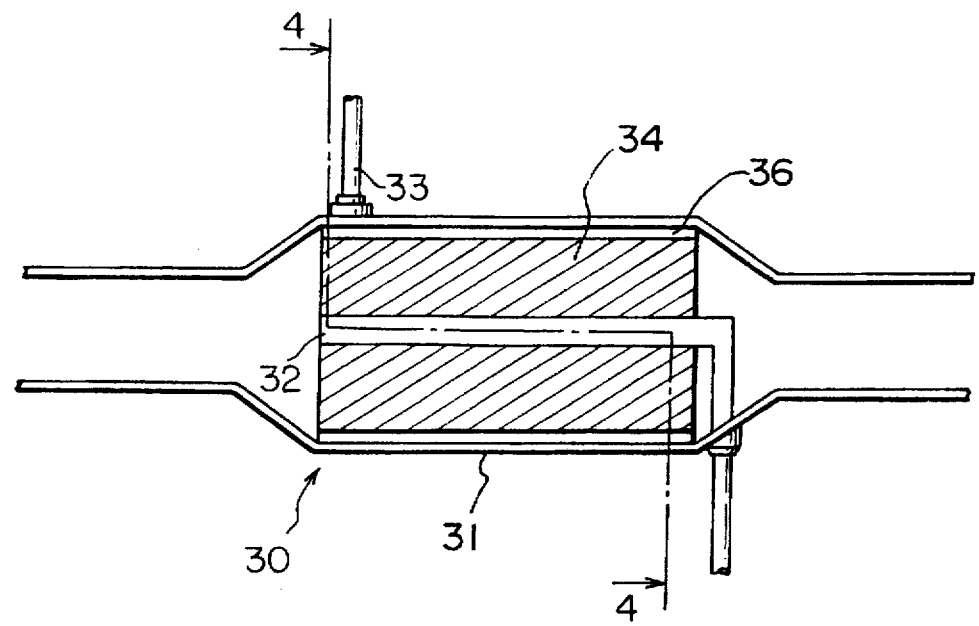
FIG. 3 is cross-sectional view of a catalytic device of the electrically heated type according to a second embodiment of the invention.
Figure 4:
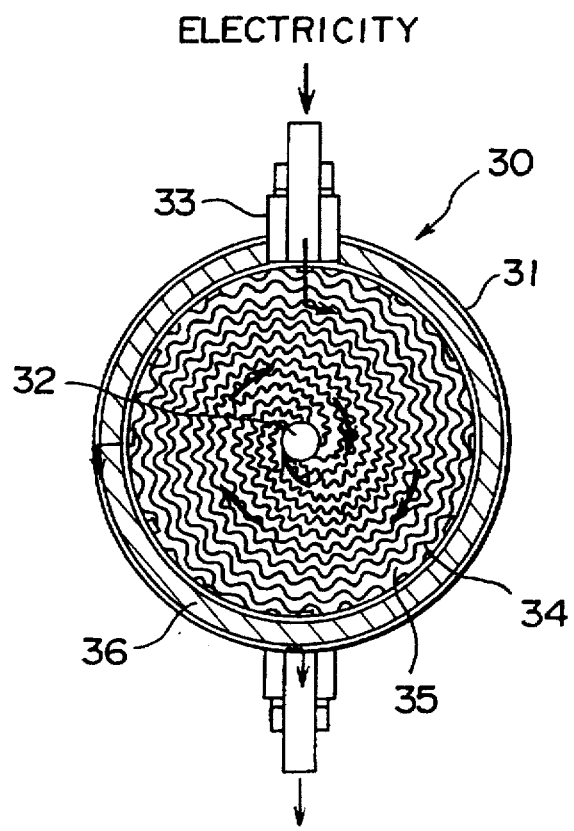
FIG. 4 is a cross-sectional view of the catalytic device along line 4—4 of FIG. 3.

FIGS. 3 and 4 show a catalytic device 30 according to a second embodiment of the invention. The catalytic device 30 comprises a canister 31 of heat resisting alloy, a central electrode 32 and an external electrode 33 which are connected to a battery power source (not shown), a carrying member 34, a catalytic layer 35 applied on the carrying member 34, and insulation material 36 surrounding the carrying member 34. As shown in FIG. 4, the carrying member 34 includes corrugated foils which are spirally wound around the central electrode 32. These foils are a kind of resistance element, and are heated by the electricity supplied via the electrodes 32 and 33 so as to activate the catalytic layer 35.

The catalytic layer 35 comprises catalyst such as platinum, and helpful agents such as transition alumina, accelerating agent and stabilizer similarly to the catalytic layer 25 of the first embodiment. In this embodiment, the catalytic layer 35 is applied on the carrying member 34 only near the gas outlet so that the catalytic layer 35 can be heated and activated immediately after the ignition. The quantity of the catalytic layer 35 is determined to be in a range where the catalytic layer 35 can be reliably activated without lowering its performance.

For instance, the carrying member 34 has a capacity of 0.3 liters (i.e. 1.5 liters each near the gas inlet and near the gas outlet, respectively). The carrying member 34 holds 1.5 grams/liter of the catalytic layer 35 of the platinum group only near the gas outlet. In this case, an electric current of 24V and 200A is applied to the carrying member 34 from the battery power source, so that the carrying member 34 is sufficiently heated to activate the catalytic layer 35.

In this arrangement, the catalytic device 30 can efficiently, effectively and reliably purify and reduce toxic substances in the exhaust gas by the catalytic layer 35 which is sufficiently heated and activated immediately after the ignition. Thus, the exhaust gas is discharged as non-toxic substances.

In the first embodiment, the catalytic device has the honey-comb structure and includes the catalytic layer whose quantity is varied near the gas inlet and the gas outlet, respectively. In the second embodiment, the catalytic device is of a modified honey-comb structure, includes the carrying member of corrugated foils in the spiral form, and the catalytic layer applied on the carrying member only near the gas outlet. Alternatively, the catalytic layer may be located only near the gas outlet in the first embodiment. Further, it is possible to dispose the catalytic layer on the carrying member both near the gas inlet and gas outlet and to differentiate the quantity of the catalytic layer near the gas inlet and gas outlet, respectively, in the second embodiment. These modified catalytic devices are as effective as those in the first and second embodiments described above.

Figure 5:
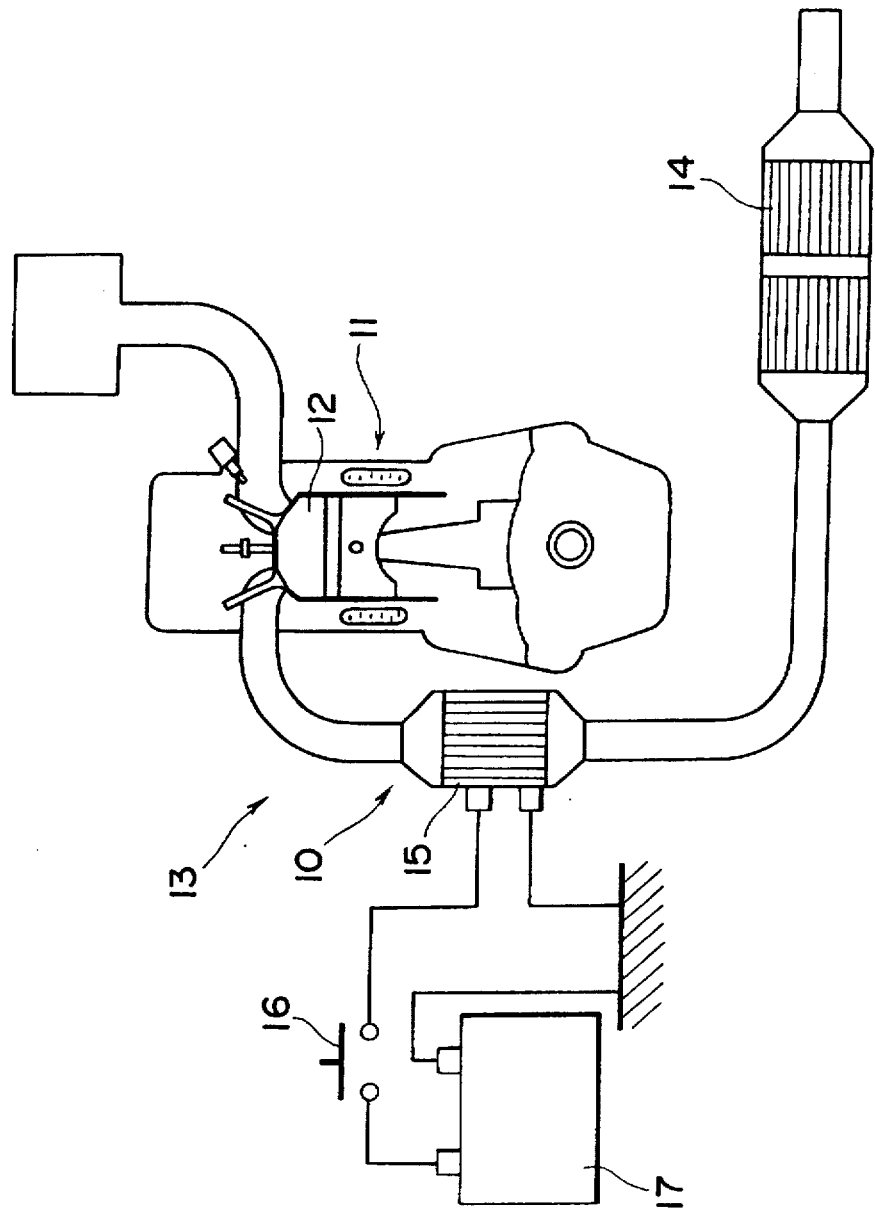
FIG. 5 is a cross-sectional view showing a catalytic device according to a third embodiment of the invention.
Figure 6:
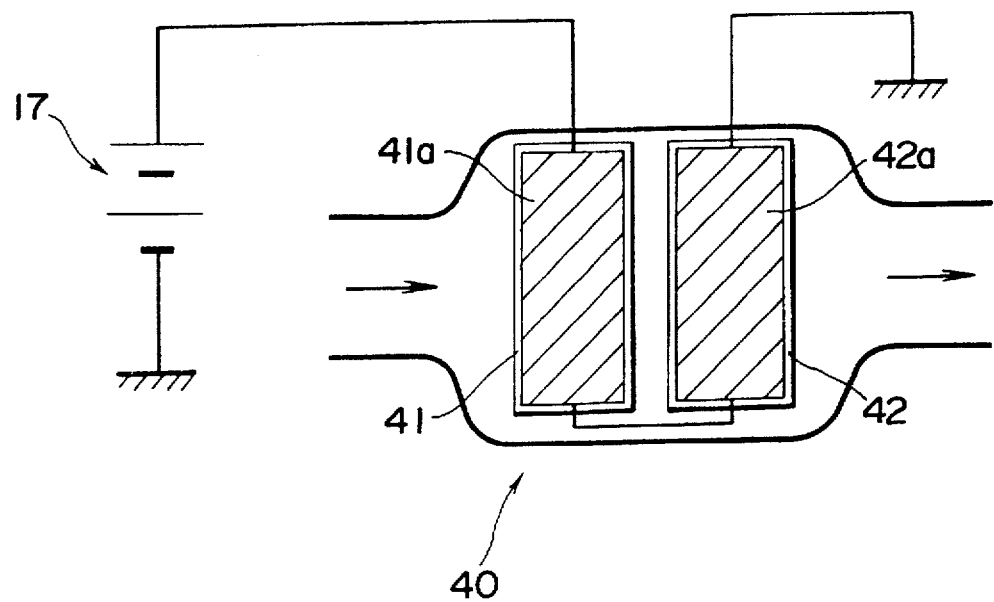
FIG. 6 is a schematic view showing the manner in which the catalytic device is disposed in an exhaust system.

Referring to FIG. 5, there is shown a catalytic device 40 according to a third embodiment of the invention, which includes two catalytic units 41 and 42 having carrying members 41a and 42a, respectively. In this case, two catalytic devices of FIG. 1 may be juxtaposed as the catalytic units 41 and 42. It is possible to differentiate the quantity of the catalytic layers on these carrying members 41a and 42a. In other words, the quantity of the catalytic layer on the carrying member 41a may be less than that in the carrying member 42a. For instance, the catalytic layer is applied by wash-coating in such a manner that the catalytic layer on the carrying member 42a is two times as great as that on the carrying member 41a. In addition, slits (not shown) are formed in the carrying member 42a in such a manner that it has a smaller electrical resistance per unit length than the electrical resistance of the carrying member 41a.

In the third embodiment, when electricity is supplied from the battery power source 17, the catalytic layer is more effectively heated and activated on the carrying member 42a. Further, the electrical resistance of the carrying member 42a is small, which extensively prevents the catalytic device from degrading its performance.

The catalytic device 40 may alternately comprise two catalytic devices of the second embodiment shown in FIG. 4 as the catalytic units 41 and 42. This catalytic device 40 can operate as effectively and reliably as the catalytic device of the second embodiment.

In this embodiment, only the carrying member 42a near the gas outlet may be applied with the catalytic layer. In this case, the catalytic layer on the carrying member 42a can be effectively heated and quickly activated so as to purify toxic substances in exhaust emissions immediately after the ignition.

As described so far, the catalytic devices according to the invention can effectively and reliably purify and reduce toxic substances in exhaust emissions even immediately following the ignition, since the thick catalytic layer near the gas outlet is quickly heated and activated via the carrying member. The quantity of the catalytic layer is greater near the gas outlet of the catalytic device than that near the gas inlet thereof.

The invention being thus described, it will be obvious that the same may be varied in many ways. Since variations are not to be regarded as a departure from the spirit and the scope of the invention, and all such modifications as would be obvious to one skilled in the art are intended to be included within the scope of the following claims.

What is claimed is:

1. A catalytic device of the electrically heated type disposed in an exhaust system comprising:

a carrying member adapted to be electrically heated; and a catalytic material applied on the carrying member which becomes active so as to purify exhaust emissions from an exhaust passage when it is heated above a predetermined temperature, wherein the quantity of the catalytic material is increased from an upstream side in the direction of flow of the exhaust gases toward a downstream side in the direction of flow of the exhaust gases, the quantity of the catalytic material at the downstream side being approximately twice as great as the catalytic material at the upstream side.

2. The catalytic device of claim 1, wherein the catalytic material is a platinum-group metal and is present in a catalytic layer containing transition alumina, accelerating agent and stabilizer.

3. A catalytic device of the electrically heated type disposed in an exhaust system comprising:

a resistance heater adapted to be electrically heated, said heater having an upstream end and a downstream end; and a catalytic material applied on said heater which becomes active so as to purify exhaust emissions from an exhaust passage when it is heated above a predetermined temperature, wherein the quantity of the catalytic material increases from said upstream end in the direction of flow of the exhaust gases toward said downstream end in the direction of flow of the exhaust gases.

4. The catalytic device of claim 3, wherein the quantity of the catalytic material at said downstream end is approximately twice as great as the catalytic material at said upstream end.

5. The catalytic device of claim 3, wherein the catalytic material is a platinum-group metal and is present in a catalytic layer containing transition alumina, accelerating agent and stabilizer.

* * * * *